United States Patent [19]

Eun et al.

[11] Patent Number: 5,147,623
[45] Date of Patent: Sep. 15, 1992

[54] FABRICATION METHOD OF CUBIC BORON NITRIDE

[75] Inventors: Kwang Y. Eun, Seoul; Jong K. Park, Kyungki-Do; Seung T. Park, Seoul, all of Rep. of Korea

[73] Assignee: Korea Institute of Science and Technology, Seoul, Rep. of Korea

[21] Appl. No.: 676,344

[22] Filed: Mar. 28, 1991

[30] Foreign Application Priority Data

Sep. 13, 1990 [KR] Rep. of Korea ............... 14472/1990

[51] Int. Cl.$^5$ .......................................... C01B 21/064
[52] U.S. Cl. .................................... 423/290; 501/96
[58] Field of Search .................... 423/290; 51/307; 501/96

[56] References Cited

U.S. PATENT DOCUMENTS

| | | | |
|---|---|---|---|
| 2,112,703 | 3/1938 | Luschenowsky | 420/542 |
| 2,947,617 | 8/1960 | Wentorf | 423/290 |
| 4,349,517 | 9/1982 | Lysanov et al. | 423/290 |
| 4,361,543 | 11/1982 | Zhdanovich et al. | 423/290 |
| 4,551,195 | 11/1985 | Iizuka et al. | 423/290 |

FOREIGN PATENT DOCUMENTS

| | | | |
|---|---|---|---|
| 58-204809 | 11/1983 | Japan | 423/290 |
| 61-117106 | 6/1986 | Japan | 423/290 |
| 603299 | 4/1979 | U.S.S.R. | 423/290 |

OTHER PUBLICATIONS

Wentorf, *J. Chem. Phys.* 34, 809 (1961).
DeVries and Fleisher, *J. Cryst. Growth* 13/14, 38 (1972).
Endo, Fukinaga, Iwata, *J. Mat. Sci.*, 16, 2227 (1981).
Susa, *Yogyo-Kyokai Shi*, 86, 202 (1978).
Veraschagin et al., Trans. IZV, Akad. Nauk SSSR. Neorg. Mat., 15, 256 (1979).
Kobayashi, *Mat. Res. Bull.* 14, 1541 (1979).

*Primary Examiner*—Wayne Langel
*Attorney, Agent, or Firm*—Birch, Stewart, Kolasch & Birch

[57] ABSTRACT

A process for preparing large granules of cubic boron nitride from hexagonal boron nitride, which comprises using a binary alloy of Al-Mg as a catalyst under high temperature and pressure wherein binary alloy can be obtained by gas spraying of the alloy melt or grinding the agglomerates and easily treated due to its low activity, whereby the resultant cubic boron nitride crystal has large size without impurities.

3 Claims, No Drawings

FABRICATION METHOD OF CUBIC BORON NITRIDE

BACKGROUND OF THE INVENTION

1. Field of the Invention

The present invention relates to a process for the fabrication of cubic boron nitride from hexagonal boron nitride by using a binary alloy of Al and Mg as a catalyst under a high temperature and a high pressure.

2. Description of the Prior Art

Generally, the cubic boron nitrides having high hardness can be synthesized only by artificial methods. Though its hardness is not higher than that of diamond, its thermal stability is better so that it can be used such an abrasive as cutting tools for hardened steel.

Such cubic boron nitride can be synthesized under a high pressure and high temperature, like a diamond, either by a direct conversion method or by a indirect catalyst method. The former is a direct fabrication method from hexagonal boron nitride and the latter is used by adding the catalyst to the hexagonal boron nitride.

Among such two methods, the indirect method is more often used because of economical merit and lots of catalysts are known such as the alkali (Li), alkali earth (Mg, Ca), the alloy of these elements and the nitrides ($Li_3N$, $Mg_3N_2$, $Ca_3N_2$) of these elements. Among these catalyst materials, $Li_3N$, $Mg_3N_2$, Mg are most often used (Wentorf, J. Chem. Phys., 34, 809 (1961)), and boro-nitrides such as $Li_3BN_2$ of above elements (DeVries and Fleisher, J. Cryst. Growth 13/14, 38 (1972)) and $Mg_2B_2N_4$ and $Ca_3B_2N_4$ (Endo, Fukunaga, Iwata, J. Mat. Sci., 16, 2227 (1981)) are also often used.

These catalysts of alkali and alkali earth elements have excellent merits for the fabrication of cubic boron nitride. However, it is very difficult to treat them since its activity is high and they react actively with the moisture in the air.

There are many useful metal catalysts such as Al, Cr, Mn, Co, Ni-Al, Sn, Sb, Fe-Al, and Si-Al. However, the cubic boron nitride crystals produced by using these catalysts contain impurities.

As compound type catalysts, urea (Susa, Yogyo-Kyokai Shi, 86, 202 (1978), hydrides such as LiH (Vereschagin et al, Trans. Izv. Akad. Nauk SSSR. Neorg. Mat., 15, 256 (1979)) and fluorides such as NaF (Kobayashi, Mat. Res. Bull, 14, 1541 (1979)) are also known. However, although the cubic boron nitride crystals synthesized by using these catalysts are such a fine powder type, these catalysts are not proper to get large cubic boron nitride crystals.

SUMMARY OF THE INVENTION

Accordingly, it is an object to provide a process for the fabrication of cubic boron nitride of the present invention to solve the several problems caused by catalysts which are used for the indirect fabrication of cubic boron nitride.

Another object of the present invention is to provide a fabrication method of cubic boron nitride from hexagonal boron nitride under high temperature and pressure by using a binary alloy catalyst of Al-Mg.

A further object of the present invention is to provide a cubic boron nitride fabrication method which is less active than the alkali and alkali earth catalysts used up to now so that it is treated in the air and get the large cubic boron nitride crystals with less impurities than that obtained by using catalysts of either Al or Mg separately.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a method for the fabrication of cubic boron nitride from hexagonal boron nitride by using a binary alloy of Al and Mg under a high temperature and a high pressure.

DESCRIPTION OF THE PREFERRED EMBODIMENTS

Referring now in detail to the present invention, there is provided a fabrication method of cubic boron nitride from hexagonal boron nitride by using a binary alloy, Al-Mg alloy, under a high temperature and pressure.

The composition of Al-Mg alloy used in the present invention is 15-80% of Mg by weight. When the content of Mg in the Al-Mg alloy is less than 15%, the size of produced cubic boron nitride crystals is small and the amount of that is little. But when it is more than 80%, the activity of catalyst is strong. Therefore it is difficult to control the crystal size and morphology due to too strong catalytic activity.

The Al-Mg alloy catalyst has a powder formulation which can be produced either by spraying the melted alloy with an inert gas or by grinding the solidified alloy ingot to the powder less than 100 $\mu$m in average diameter.

According to the present invention, the fabrication method of cubic boron nitride in detail is as follows.

First, to powdered Al-Mg alloy catalyst, of which amount is varied in the range of 0.5-30% in weight, is added and mechanically mixed to the hexagonal boron nitride powder having the purity of 99.9%. At this moment, when the content of catalyst is less than 0.5% of the mixture by weight, the product of cubic boron nitride is of small quantity. When it is in the range of 30-99% by weight, it is difficult to control the crystal size and morphology in the product of that due to too much conversion.

Next, a synthesized batch is set in an ultra high pressure cell and the cubic boron nitride is obtained by treating it at a temperature of 1,450°-1,650° C. under the pressure of 50-60 Kbar for 30 min.

The morphology, size, color, and transformed amount of the cubic boron nitride produced by above method are dependent upon the content of Al-Mg catalyst or content of Mg in the catalyst.

That is, the amount of the cubic boron nitride transformed from the hexagonal boron nitride increases according to increase of the content of Mg in the Al-Mg catalyst. However, its increase makes crystal less transparent and crystal morphology more irregular. And the amount of the cubic boron transformed from nitride increases according to increase of the amount of catalyst added in case of same composition of Al-Mg catalyst.

Higher the reaction temperature is, better developed crystal face of the cubic boron nitride crystal has in case of the batch in same condition. Especially, when the size of Al-Mg catalyst powder is larger than 100 μm in diameter, not the well dispersed cubic boron nitride catalyst but the agglomerates of them are obtained.

The present invention will now be described in more detail in connection with the following examples which should be considered as being exemplary and not limiting the present invention.

EXAMPLE 1

The synthesized and formed batch, the hexagonal boron nitride powder (99.9%) in which the 1 wt % of Al-Mg catalyst powder containing 44 wt % of Mg had been added, was treated at a temperature of 1,460° C. under a pressure of 53 Kbar in an ultra high pressure cell for 30 min. and the cubic boron nitride was obtained.

The obtained crystals of the cubic boron nitride exhibited well developed crystal face and their average diameter was 100–150 μm. They were of opaque black color.

EXAMPLE 2

The synthesized and formed batch, the hexagonal boron nitride powder (99.9%) in which the wt % of Al-Mg catalyst powder containing 44 wt % of Mg had been added, was treated at a temperature of 1,460° C. under a pressure of 55 Kbar in an ultra high pressure cell for 30 min. and the cubic boron nitride was synthesized.

The morphology of synthesized cubic boron nitride crystals were irregular and their average diameter was 100 μm. They were of dark brown color.

EXAMPLE 3

The synthesized and formed batch, the hexagonal boron nitride powder (99.9%) in which the 1 wt % of Al-Mg catalyst powder containing 60 wt % of Mg had been added, was treated at a temperature of 1,460° C. under a pressure of 54 Kbar in an ultra high pressure cell for 30 min. and the cubic boron nitride was produced.

The average diameter of produced crystals was 100 μm and they were of black color

EXAMPLE 4

The synthesized and formed batch, the hexagonal boron nitride powder (99.9%) in which the 1 wt % of Al-Mg catalyst powder containing 44 wt % of Mg had been added (the same composition as example 1), was treated at a temperature of 1,650° C. under a pressure of 57 Kbar in an ultra high pressure cell for 30 min. and the cubic boron nitride was synthesized.

The synthesized crystals of the cubic boron nitride exhibited well developed crystal face and their average diameter was 140 μm. They were of transparent brown color.

EXAMPLE 5

The synthesized and formed batch, the hexagonal boron nitride powder (99.9%) in which the 0.5 wt % of Al-Mg catalyst powder containing 44 wt % of Mg (the same composition as example 1) had been added, was treated at a temperature of 1,460° C. under a pressure of 53 Kbar in an ultra high pressure cell for 30 min. and the cubic boron nitride was synthesized.

The synthesized crystals of the cubic boron nitride exhibited well developed crystal face and their average diameter was 100 μm. A small amount of isolated crystals of the cubic boron nitride was formed sporadically.

EXAMPLE 6

The synthesized and formed batch, the hexagonal boron nitride powder (99.9%) in which the 3 wt % of Al-Mg catalyst powder containing 44 wt % of Mg had been added, was treated at a temperature of 1,460° C. under a pressure of 53 Kbar in an ultra high pressure cell for 30 min. and the cubic boron nitride was synthesized.

Most hexagonal boron nitride was transformed to the cubic boron nitride and the synthesized cubic boron nitride had the microstructure like that of the sintered cubic boron nitride body.

EXAMPLE 7

The hexagonal boron nitride powder (99.9%) in which the 5 wt % of Al-Mg catalyst powder containing 50 wt % of Mg having an average diameter of 100 μm had been added, was treated at a temperature of 1,460° C. under a pressure of 53 Kbar in an ultra high pressure cell for 30 min. and the cubic boron nitride was synthesized.

The synthesized crystals of the cubic boron nitride had the agglomerate form.

EXAMPLE 8

The condition was same as example 7 except the average diameter of Al-Mg catalyst powder which was less than 44 μm and cubic boron nitride was synthesized.

Isolated crystals of the cubic boron nitride was synthesized homogeneously and the average diameter of crystals was about 150 μm.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A process for preparing large granules of cubic boron nitride greater than 100 μm in diameter, which comprises providing hexagonal boron nitride in the presence of a binary alloy of Al-Mg as a catalyst, at a temperature of about 1,450° C. to 1,650° C. and under a pressure of about 50Kbar to 60Kbar.

2. The process of claim 1, wherein said Al-Mg binary alloy catalyst is added homogeneously to said hexagonal boron nitride in an amount of from 0.5–30% by weight for effectively converting said hexagonal boron nitride to said large granules of cubic boron nitride.

3. The method of claim 2, wherein said Al-Mg binary alloy catalyst contains Mg from 15–80% by weight.

* * * * *